Aug. 21, 1962 D. S. IRONSIDE 3,050,644
TRANSISTOR DECISION AMPLIFIER WITH TEMPERATURE
COMPENSATING MEANS
Filed Dec. 10, 1959
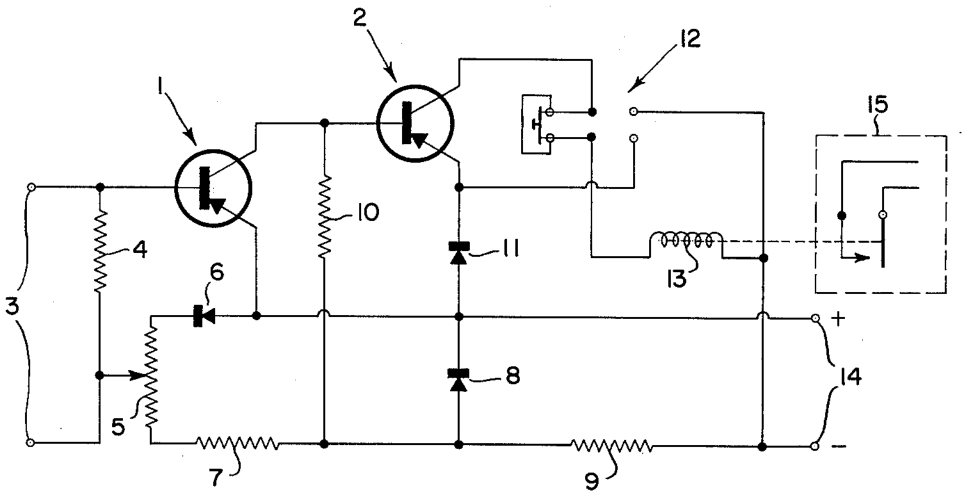
INVENTOR.
DONALD S. IRONSIDE
BY Arthur H. Swanson
ATTORNEY.

3,050,644

TRANSISTOR DECISION AMPLIFIER WITH TEMPERATURE COMPENSATING MEANS

Donald S. Ironside, King of Prussia, Pa., assignor to Minneapolis-Honeywell Regulator Company, Minneapolis, Minn., a corporation of Delaware Filed Dec. 10, 1959, Ser. No. 858,785
7 Claims. (Cl. 307—88.5)

This invention relates to electrical apparatus. More specifically, the present invention relates to electrical amplifiers.

An object of the present invention is to provide an improved transistorized electrical decision amplifier.

Another object of the present invention is to provide an improved transistorized electrical decision amplifier for indicating a high or low amplitude condition of an input signal.

A further object of the present invention is to provide an improved transistorized electrical decision amplifier having a temperature-compensating means for a reference signal comparison circuit.

A still further object of the present invention is to provide an improved electrical decision amplifier, as set forth herein, which is characterized by simple operation and construction.

In accomplishing these and other objects, there has been provided, in accordance with the present invention, an electrical decision amplifier having a plurality of transistorized amplifying stages. A reference signal circuit is used to provide a reference signal in opposition to an input signal applied to a first amplifying stage. This circuit, which includes temperature-sensitive elements, is also used to supply a bias signal to the first amplifying stage as temperature compensation therefor. Thus, the temperature-sensitive characteristic of the circuit is effective to vary the reference signal and the bias signal to maintain the amplifying effect of the first transistor stage independent of temperature.

A better understanding of the present invention may be had from the following detailed description when read in connection with the accompanying drawing, in which the single figure represents a schematic representation of a transistorized decision amplifier embodying the present invention.

Referring to the drawing in more detail, there is shown a first transistor 1 and a second transistor 2 each having an emitter, collector and base terminals. The first and second transistors 1 and 2 are connected in a cascade relationship as a first and a second amplifying stage, respectively. Specifically, the collector of the first transistor 1 is directly connected to the base of the second transistor 2. The base of the first transistor 1 is connected to a first one of a pair of input-terminals 3 which are provided for connection to a source of input signals. An input resistor 4 is connected across the input terminals 3. The slider of a potentiometer 5 is connected to a second one of the input-terminals 3. A first end of the potentiometer 5 is connected to the cathode of a temperature-sensitive diode 6. The opposite end of the potentiometer 5 is connected to a first end of a temperature-sensitive resistor 7. The anode of the diode 6 is connected to the emitter of the first transistor 1 and to a direct-current regulating circuit comprising a Zener diode 8 and a voltage-dropping resistor 9. The cathode of the Zener diode 8 is connected to the anode of the temperature-sensitive diode 6 and to one of a pair of direct-current terminals 14. The direct-current terminals 14 are provided for connection to a source of direct-current signals. The anode of the Zener diode 8 is connected to a second end of the temperature-sensitive resistor 7 and to a first end voltage-dropping resistor 9 is connected to the remaining one of the pair of direct-current terminals 14. A load resistor 10 is connected between the collector of the first transistor 1 and the anode of the Zener diode 8. The signal appearing across the load resistor 10 is applied as an input signal to the base of the second transistor 2. A bias diode 11 is connected between the aforesaid direct-current regulating circuit and the emitter of the second transistor 2. The bias diode 11 is arranged with its cathode connected to the emitter of the second transistor 2 and its anode connected to the cathode of the Zener diode 8.

The collector of the second transistor 2 is connected to a first pole of a double-pole, double-throw switch 12. A second pole of the switch 12 is connected to a first end of a relay coil 13. The switch 12 has a first and a second fixed contact associated with each of its poles in corresponding positions of the poles; i.e., a first position of the poles is effective to connect the poles with their corresponding first fixed contacts. The first fixed contacts of the switch 12 are connected together. On the other hand, the second fixed contact associated with the first pole is connected to the second end of the relay coil 13 and the second end of the voltage dropping resistor 9. The second contact associated with the second pole is connected to the emitter of the second transistor 2. By this arrangement, the switch 12 is used to connect the relay coil 13 either in series or in parallel with second transistor 2 to constitute a series or a shunt load for the second transistor, respectively. A relay-controlled device 15 is arranged to be responsive to the energization of the relay coil 13.

The mode of operation of the device of the present invention follows:

Assume the switch 12 is in one of its two possible positions; e.g., the position illustrated in the drawing, and the polarity of the direct-current supply connected to the direct-current terminals 14 is the polarity shown at these terminals in the drawing. The Zener diode 8 and the voltage-dropping resistor 9 are effective to regulate the direct-current signal applied thereto from the source connected to the terminals 14. This regulated direct-current signal is applied to a serial combination comprising the temperature-sensitive diode 6, the potentiometer 5 and the temperature-sensitive resistor 7 to maintain a constant current therethrough. The temperature-sensitive resistor 7 is effective to compensate any temperature-produced variation in the operation of the Zener diode 8. For example, an increase in temperature is effective to increase the regulated voltage controlled by the Zener diode 8. The resistor 7 is arranged to have a positive temperature coefficient; i.e., an increase in temperature is effective to increase the resistance of the resistor 7. Thus, the increase in the regulated voltage is compensated by the increased resistance of the resistor 7 to maintain the current through the aforesaid serial combination at a constant value.

The potentiometer 5 is preset to supply a suitable reference signal at the slider thereof. This reference signal is connected to the input resistor 4 in opposition to the signal developed across the input resistor 4 corresponding to the input signal applied to the input terminals 3. Further, the temperature-sensitive diode 6 has a voltage drop appearing across it, which voltage drop is also in opposition to the input signal appearing across the input resistor 4. The aforesaid voltage drops; i.e., the voltage appearing across the diode 6, at the slider of the potentiometer 5 and across the input resistor 4 are arranged to form a composite input signal for the first transistor 1. The reference signal component of this composite signal comprises the sum of the voltage drop across the temperature-compensating diode 6 and the voltage appearing at the slider of the potentiometer 5.

The effect of environmental temperature on transistor characteristics is well-known in the art. Briefly, the effect of a temperature variation is to vary all the parameters of a transistor including the collector impedance, the intrinsic, or zero amplitude input signal, collector current and the minimum, or threshold input signal effective to produce an output signal. The variation in the threshold input signal requirement is the determining factor in the satisfactory operation of a transistor amplifier. It has been found that the required threshold signal decreases with an increase in the ambient temperature. Accordingly, in order to maintain the output signal of the transistor at a constant level for a constant input signal, a temperature-sensitive compensation is needed to offset the variation in the required threshold signal.

The temperature-sensitive diode 6 is arranged to provide a temperature characteristic which is similar to that of the first transistor 1. A suitable diode for this application may be a transistor identical with the type used for the first transistor 1. The base and emitter leads of this transistor may be used as the diode 6 with the collector lead being unemployed. Further, the temperature-sensitive diode 6 may be mounted on a common thermally-conductive support with the first transistor 1. Additionally, it is desirable to mount the Zener diode 8 and the temperature-sensitive resistor 7 on the aforesaid thermally-conductive support in proximity to the aforesaid elements.

The temperature-sensitive diode 6 is effective to vary the reference voltage at the slider of the potentiometer 5 by means of a variation in the voltage drop across the diode 6. Thus, the reference voltage which is subtracted from the input signal is effectively temperature-dependent to compensate for the temperature variation of the required threshold signal of the first transistor. For example, assume an input signal is applied to the input terminals 3 having a polarity which is opposite to that of the reference signal and having an amplitude which is less than the amplitude of the reference signal. The reference signal is arranged to bias the first transistor into a conducting condition which condition is effective to maintain the second transistor 2 in a non-conducting state. Accordingly, the difference signal resulting from the combination of the aforesaid input signal and the reference signal is still effective to maintain the first transistor 1 in a conducting condition.

Further, the second transistor 2 is maintained in a non-conducting condition and the relay coil 13 is not energized. If the input signal is increased to an amplitude which is greater than the reference signal, the polarity of the signal applied to the first transistor 2 is reversed. A further increase in the input signal will eventually produce a non-conductive state in the first transistor 1 at a signal level corresponding to the threshold voltage thereof. However, an increase in the ambient temperature is effective to lower the aforesaid threshold voltage of the first transistor 1. Consequently, a greater increase in the input signal is required to reach this altered threshold voltage, and an uncompensated decision amplifier would not indicate the true condition of the input signal.

However, the increase in temperature is also effective to decrease the voltage drop across the temperature-sensitive diode 6. This decrease effectively decreases the reference signal. The decreased reference signal is subtracted from the input signal to produce a lower applied signal to the first transistor 1. Thus, the input signal need only increase to the level which produced non-conduction of the first transistor 1 before the temperature increase to reach the threshold signal. Accordingly, the effect of the temperature increase on the first transistor 1 is obviated by the temperature-sensitive diode 6, and the decision amplifier is able to indicate the true increase of the input signal. Further, the effect of the temperature variation on the Zener diode 8 is neutralized by the effect of the temperature-sensitive resistor 7, as previously discussed. In addition, the resistor 7 is effective to maintain the current through the diode 6 and the potentiometer 5 at a constant value to compensate for the temperature variation in the internal resistance of the diode 6.

The second transistor 2 is effective to amplify the signal across the load resistor 10 corresponding to the non-conducting state of the first transistor 1. The output signal from the second transistor 2 is applied to the relay coil 13 through the switch 12. The relay coil 13 is arranged to close the relay contacts 15 at a preselected amplitude of the output signal from the second transistor 2. This output signal corresponds to a predetermined increase in the input signal. Thus, the decision amplifier as shown in the drawing is a high amplitude device which is effective to energize the relay coil 13 to indicate an excessive amplitude of the input signal over the reference signal.

The apparatus of the present invention may also operate as a low amplitude indicating device. Assume the switch 12 is the other position from that shown in the drawing. The relay coil 13 is now placed in parallel with the second transistor 2. The relay coil 13 is continuously energized by the direct current supply connected to the direct-current terminals 14 when the second transistor 2 is not conducting. When the second transistor 2 is conducting, the energizing current is shunted around the relay coil 13 by the second transistor 2 which is effectively a short circuit path. As previously discussed, the conducting condition of the second transistor 2 corresponds to a non-conducting condition of the first transistor 1 or to an input signal amplitude greater than the reference signal amplitude. Thus, when the input signal falls below the reference signal, the second transistor 2 is driven to a non-conducting condition, and the relay coil 13 is energized to indicate a low amplitude of the input signal with reference to the reference signal.

Accordingly, it may be seen that there has been provided, in accordance with the present invention, a transistorized decision amplifier for indicating a high or a low condition of an input signal, which amplifier is characterized by temperature compensation of the transistorized reference signal comparison circuit.

What is claimed is:

1. A decision amplifier comprising reference signal means for producing a comparison signal to be compared with an input signal, said means including means for altering said comparison signal in accordance with changes in ambient temperature, means for subtracting said comparison signal from said input signal to produce a difference signal, a first transistor amplifying stage, means for applying said difference signal as an input signal to said amplifying stage, a second amplifying stage, means connecting said first stage and said second stage in cascade relationship, and utilization means responsive to an output signal from said second stage whereby to indicate a predetermined relationship of said first mentioned input signal and said comparison signal.

2. A decision amplifier comprising reference signal means for producing a comparison signal to be compared with an input signal, said means including a temperature-responsive means for altering said comparison signal in accordance with changes in ambient temperature, said reference signal means comprising a temperature-sensitive diode, a temperature-sensitive resistor, and a potentiometer having a slider, a first end and a second end, means connecting said diode and said resistor to the corresponding ones of said first and said second ends and means for energizing said temperature-responsive means, means connected to said slider for subtracting said comparison signal from said input signal to produce a difference signal, a first transistor amplifying stage, means for applying said difference signal as an input signal to said amplifying stage, a second amplifying stage, means connecting said first stage and said second stage in cascade relationship, and utilization means responsive to an output signal from said second stage whereby to indicate a predetermined relationship of said input signal and said comparison signal.

3. A decision amplifier comprising reference signal means for producing a comparison signal to be compared with an input signal, said means including a potentiometer having a slider, a first end and a second end, a temperature-sensitive resistor, means connecting one end of said resistor to said first end of said potentiometer, a temperature-sensitive diode having an anode and a cathode, means connecting said cathode of said diode to said second end of said potentiometer, and means for energizing said reference signal means, means connected to said slider for subtracting said comparison signal from said input signal, a first transistor amplifying stage, means for applying said difference signal as an input signal to said amplifying stage, a second amplifying stage, means connecting said first stage and said second stage in cascade relationship, and utilization means responsive to an output signal from said second stage whereby to indicate a predetermined relationship of said input signal and said comparison signal.

4. A decision amplifier comprising reference signal means for producing a comparison signal to be compared with an input signal, said means including a potentiometer having a slider, a first end and a second end, a temperature-sensitive resistor, means connecting one end of said resistor to said first end of said potentiometer, a temperature-sensitive diode having an anode and a cathode, means connecting said cathode of said diode to said second end of said potentiometer and means connected to said anode and to the other end of said resistor for energizing said reference signal means with a unidirectional energizing signal, a first transistor amplifying stage, said stage including a transistor having an emitter, a base and a collector, means connecting said emitter to said cathode of said diode, an input resistor for developing an input signal thereacross, means connecting said input resistor between said slider and said base for applying a difference signal between said comparison signal and said input signal as an input signal to said amplifying stage, a second amplifying stage, means connecting said first stage and said second stage in cascade relationship, and utilization means responsive to an output signal from said second stage whereby to indicate a predetermined relationship of said input signal and said comparison signal.

5. A decision amplifier comprising reference signal means for producing a comparison signal to be compared with an input signal, said means including means for alterating said comparison signal in accordance with changes in ambient temperature, means for subtracting said comparison signal from said input signal to produce a difference signal, a transistor amplifying stage, means for applying said difference signal as an input signal to said amplifying stage, and means responsive to an output signal from said amplifying stage to indicate a predetermined relationship of said input signal and said comparison signal.

6. A decision amplifier comprising a transistor amplifying stage, said stage having a characteristic temperature sensitive mode of operation, reference signal means for producing a comparison signal to be compared with an input signal, said means including means for altering said comparison signal in accordance with changes in ambient temperature to compensate for the temperature sensitivity of said amplifying stage, said last mentioned means including a temperature-sensitive diode having a temperature-responsive characteristic similar to the temperature-responsive characteristic of said amplifying stage, means for subtracting said comparison signal from said input signal to produce a difference signal, means for applying said difference signal as an input signal to said amplifying stage, and means responsive to an output signal from said amplifying stage to indicate a predetermined relationship of said input signal and said comparison signal.

7. A decision amplifier comprising reference signal means for producing a comparison signal to be compared with an input signal, said means including means for altering said comparison signal in accordance with changes in ambient temperature, means for subtracting said comparison signal from said input signal to produce a difference signal, a transistor amplifying stage, and means for applying said difference signal as an input signal to said amplifying stage whereby said last mentioned input signal is indicative of a temperature dependent relationship between said first mentioned input signal and said comparison signal.

References Cited in the file of this patent

UNITED STATES PATENTS

| | | |
|---|---|---|
| 2,802,071 | Lin | Aug. 6, 1957 |
| 2,808,471 | Poucel et al. | Oct. 1, 1957 |